US006020829A

United States Patent [19]

Hörmann

[11] Patent Number: 6,020,829

[45] Date of Patent: Feb. 1, 2000

[54] MULTIPLE REMOTE CONTROL SYSTEM

[75] Inventor: Michael Hörmann, Halle/Westf., Germany

[73] Assignee: Marantec Antriebs-und Steuerungstechnik GmbH & Co. Produktions KG, Marienfeld, Germany

[21] Appl. No.: 08/842,059

[22] Filed: Apr. 23, 1997

[30] Foreign Application Priority Data

Apr. 24, 1996 [DE] Germany .......................... 196 16 399

[51] Int. Cl.[7] .................................................. H04Q 1/00

[52] U.S. Cl. ................................. 340/825.69; 341/176

[58] Field of Search ......................... 340/825.69, 825.72, 340/825.31; 348/734; 341/176; 318/453

[56] References Cited

U.S. PATENT DOCUMENTS

| | | | |
|---|---|---|---|
| 4,394,607 | 7/1983 | Lemirande | 318/453 |
| 4,626,848 | 12/1986 | Ehlers | 340/825.69 |
| 4,750,118 | 6/1988 | Heitschel | 340/825.69 |
| 4,825,200 | 4/1989 | Evans | 340/825.72 |
| 4,905,279 | 2/1990 | Nishio | 340/825.69 |
| 4,999,622 | 3/1991 | Amano | 341/176 |
| 5,410,326 | 4/1995 | Goldstein | 340/825.69 |

FOREIGN PATENT DOCUMENTS

| | | |
|---|---|---|
| 2923962 | 1/1980 | Germany . |
| 3332761 | 4/1984 | Germany . |
| 3625555 | 4/1987 | Germany . |

OTHER PUBLICATIONS

8–in–1 Universal Remote Control, Tandy Corp, 1990.

*Primary Examiner*—Brian Zimmerman
*Attorney, Agent, or Firm*—Dilworth & Barrese

[57] ABSTRACT

A remote control for the wireless transmission of control commands from a transmitter to at least one receiver, with an encoding device provided in the transmitter which effects an encoding of the control commands to be transmitted. In a first transmitter different codes are stored for each receiver. Via a data link between the first transmitter and a second transmitter, which data link can be made temporarily, at least one code is transferred from the encoding device of the first transmitter to the encoding device of the second transmitter.

13 Claims, 2 Drawing Sheets

MULTIPLE REMOTE CONTROL SYSTEM

BACKGROUND OF THE INVENTION

The present invention relates to a remote control for the wireless transmission of control commands from a transmitter to at least one receiver, in particular for the remote control of several garage doors, in accordance with an encoding device provided in the transmitter which effects the encoding of the control commands to be transmitted.

Particularly with the underground car-parks of fairly large residential estates, it has now become usual to have electrical operation of the garage doors closing off access to the underground car-park and to operate the garage doors by means of a remote control. To prevent any unauthorized opening or closing of the garage doors, diverse remote controls of the type first mentioned are known.

Patent specification DE 29 23 962 C2 discloses a remote control where a specific code can be set or preset in the transmitter. The control commands to be transmitted are encoded by the code in an encoding device on the transmitter side so that only the designated receiver responds to the control commands transmitted. By means of a signal change-over facility in the receiver, this can be initialized with the code on the transmitter side being able to be transferred to and stored on the receiver. To ensure that the code in the receiver can only be initialized by authorized persons, it is provided that the signal change-over facility on the receiver side can be manually actuated by means of an element inaccessible to non-authorized persons.

Patent specification DE 33 32 761 C2 discloses another possibility to protect the remote control from unauthorized use. Security against unauthorized persons is achieved by providing a (quasi) random generator at the receiver for code generation and by a temporary data link being able to be set up to transfer the code from the receiver to the transmitter.

Both of the above remote controls have the disadvantage that they can only be used for a specific garage door. However, a remote control is desirable which can be used for different user groups and for different garage doors. Such a remote control is known from patent specification DE 36 25 555 C2. To allow the transmitter of the remote control to be used for different receivers, the receiver is fitted with a memory location option switch which can be used to select a memory location when the code of the corresponding transmitter is to be transmitted to the receiver. The receiver can thus be initialized for several codes so that control commands from different transmitters with different codes can be evaluated. One substantial disadvantage of this remote control can be found in the fact that several codes have to be evaluated by the receiver. Due to the limited computation capacity of the microprocessor used, the number of transmitters which can be evaluated is therefore also limited. A further disadvantage of such a remote control is that the fixed-position receiver can only be initialized in an awkward and complex manner.

SUMMARY OF THE INVENTION

It is therefore the object of the present invention to provide a remote control which allows the flexible use of several transmitters for several receivers.

This object is solved by the features given in a first transmitter a different code is stored for each receiver, and a data link can be generated temporarily between the first transmitter and the second transmitter in such a way that one code can be transferred from the encoding device of the first transmitter to the encoding device of the second transmitter. The solution according to the invention is that a data link can be set up temporarily between a first transmitter and a second transmitter in such a way that at least one code from the encoding device of the first transmitter can be transferred to the encoding device of the second transmitter with a different code for each receiver being stored in the encoding device of the first transmitter.

The advantages gained with the invention are, in particular, that only one code is allocated to one receiver so that one receiver can be operated from an unlimited number of transmitters. A further advantage of the invention is that beginning with an already encoded transmitter, the encoding of further transmitters can be performed spatially independent of the receiver. In this way, the transmitters can be encoded at any location so that the awkward encoding in an underground car-park passage subject to heavy traffic is not necessary.

In accordance with one preferred embodiment it is provided that at least one universal transmitter is provided as the first transmitter and several user-configurable transmitters as the second transmitter with a code being able to be transferred to other transmitters exclusively by a universal transmitter. By means of such a differentiation of several transmitters, a hierarchical allocation of the individual transmitters for several user groups is possible. This allocation is similar to the systematics of a fairly large locking system where a universal key exists for all locks and further keys with user-specific access to the single locks. By means of such a hierarchical management of the single transmitters of the remote control, a simultaneous increase in the security of the whole remote control is produced as only the person in possession of the universal transmitter can provide an encoding of the user-configurable transmitters.

Appropriately, in a universal transmitter the corresponding codes can be stored in an unalterable manner during its manufacture. In this way, it can be ensured at the place of production that each code actually does occur only once in the supplied universal transmitters. This means that the universal transmitter is always equipped with an exclusive code. However, a pre-encoding of the universal transmitter with a random generator whose generated random number possesses a correspondingly low probability is also feasible.

In accordance with an alternative embodiment, a universal transmitter is designed in such a way that a personal code can be set by the user. A corresponding embodiment can, for example, include a hidden button in the universal transmitter which allows the universal transmitter to be re-encoded on activation. This re-encoding can be performed by an integrated random generator which can be activated on activation of the button.

The universal transmitter supplied in this configuration then offers the possibility of reproducing the codes stored in it in a desired manner. In particular, it can be provided that a receiver can be initialized by a universal transmitter by a code stored in the universal transmitter being able to be transferred to and stored in the relevant receiver by means of a switch-over facility on the receiver side. Thanks to such an initialization, the corresponding receiver is allocated a certain code once which is then transmitted in accordance with the invention to the relevant receivers which are to receive an access authorization for this receiver.

In accordance with a further preferred embodiment, it is provided that a certain button on a transmitter is allocated to each code stored in the encoding device and that when this button is pressed, the control commands encoded by the relevant code are transmitted. With such a design of the transmitter therefore, when a certain button is pressed, only one code is transmitted which is allocated to this button. If the code agrees with the code stored in the receiver, the control commands transmitted can be evaluated by the receiver, otherwise the control commands transmitted will be rejected.

In accordance with a further preferred embodiment, it is provided that exactly one button is provided on the user-configurable transmitters and that when this button is pressed repeatedly the emission of several sequences of control commands is performed with the number of sequences corresponding to the number of the codes stored in the encoding device and with each sequence being encoded with a different code in each case. In this way, at least the user-configurable transmitters can be designed in an extremely simply manner as the codes stored in the transmitter are always transmitted in sequence when the button is pressed. As a result, a certain button with an allocated code no longer needs to be selected, but rather all codes are transmitted in a collective manner. The relevant receiver checks whether one of the codes received corresponds to the code initialized in the receiver, if agreement is found, evaluates the control commands transmitted and otherwise rejects the information received.

In accordance with a further preferred embodiment, a display unit is provided on a transmitter, which display unit displays the current status of the transmitter. For example, a green LED can indicate when the relevant receiver responds to the transmitter, or a red LED lights up if the receiver cannot evaluated the encoded control commands. Another mode of the transmitter to be displayed could be the power supply of the battery with a corresponding LED appropriately indicating when the charge status of the batteries falls below a given value. The data link between the first transmitter and the second transmitter preferably consists of an electrical line connection as in this way the data link can be generated with a low effort. The plug contacts for the electrical line connection in the transmitters can be designed in such a way that the transmitters automatically switch over to internal data link when the line connection is plugged in. Of course, it is, however, also possible that the data link be provided between the first transmitter 15 and the second transmitter 16 by means of a wireless connection 17, 18, for example, by means of an opto-electronic connection or a radio connection (FIG. 3).

Another characteristic of the inventive concept for which protection is claimed independently consists of a method for the transfer of a code between a first transmitter and a second transmitter of the remote control in accordance with the invention. The method consists of the steps given in a) a data link is made between the first transmitter and the second transmitter, b) a button allocated to the code to be transferred is pressed on the first transmitter, c) a button on the second transmitter is pressed which should be allocated to the code to be transferred, in which way the data transferred is started, d) the transferred code of the first transmitter is stored in the encoding device of the second transmitter, and e) the data link between the first transmitter and the second transmitter is interrupted again, or a) a data link is made between the first transmitter and the second transmitter, b) the codes to be transferred are selected by pressing the corresponding buttons on the first transmitter, c) the data transfer is started by pressing a button provided for this purpose, d) the transferred codes of the first transmitter are stored in the encoding device of the second transmitter, and e) the data link between the first transmitter and the second transmitter is interrupted again.

Which method is used, depends on whether with the second transmitter, which is normally the user-configurable transmitter, a separate transmission of the single codes can be performed or whether all codes are intended to be transmitted in series by a button.

For the first case it is provided that a selective transfer of codes and also a selective transfer of the button allocation is possible. In this way, the buttons existing on the user-configurable transmitters can be configured in any manner. In particular, it is possible that the buttons existing on the user-configurable transmitters and the corresponding codes represent a subset of the universal transmitter. For example, the universal transmitter could therefore possess four buttons with four corresponding codes while the user-configurable transmitters only possess two buttons to which only two of the four possible codes are allocated.

In the second case, the transfer of the codes in accordance with the invention from the encoding device of the first transmitter to the encoding device of the second transmitter is performed in a collective manner for one button with a selection of the codes to be transmitted being able to be performed beforehand by means of the first transmitter.

BRIEF DESCRIPTION OF THE DRAWINGS

Further details and advantages of the invention are explained by means of two embodiments shown in the drawing which shows.

DESCRIPTION OF THE PREFERRED EMBODIMENTS

Figure 1:
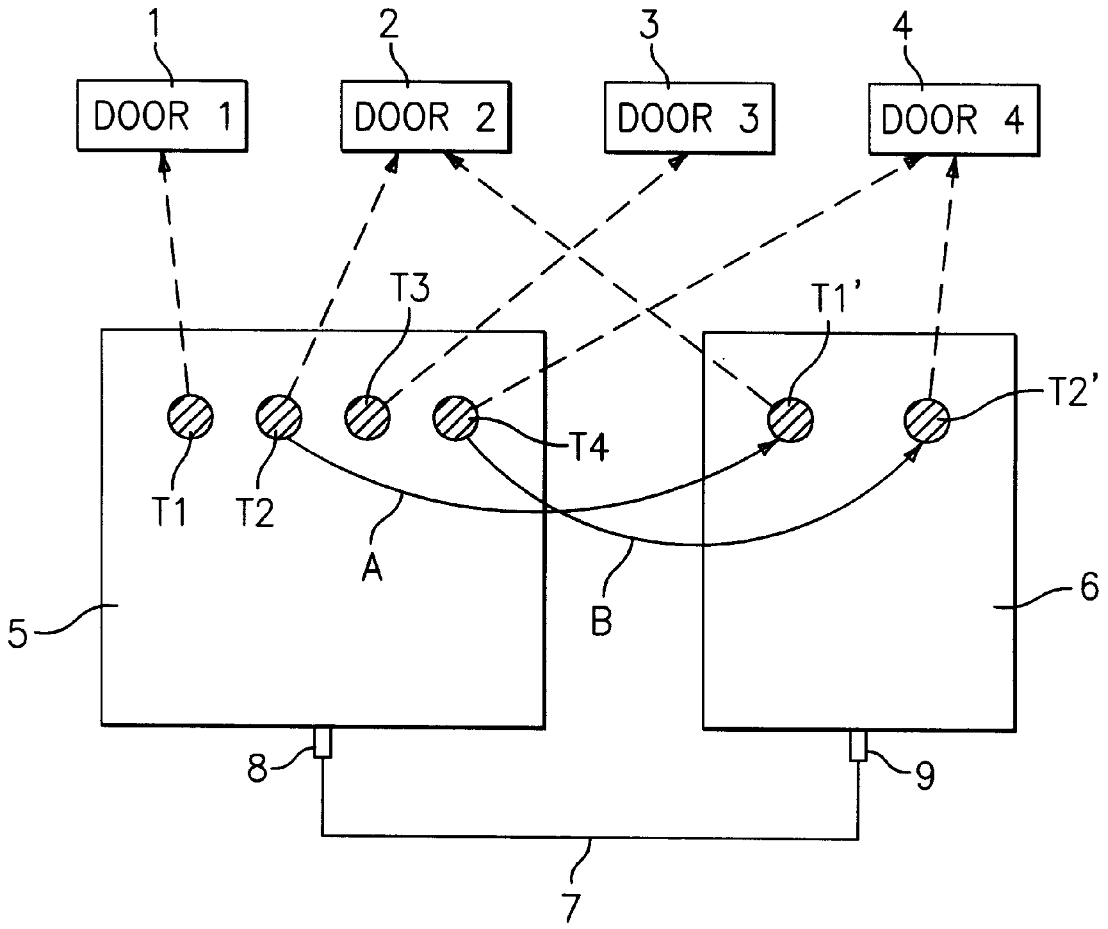
FIG. 1: a schematic representation of a first embodiment of the code transfer between two transmitters in accordance with the invention.

FIG. 1 shows a schematic representation of a first embodiment of the code transfer between two transmitters in accordance with the invention. An arrangement is presented with four garage doors 1, 2, 3 and 4 and with a universal transmitter 5 and a user-configurable transmitter 6. The universal transmitter 5 possesses four buttons T1, T2, T3 and T4 with relevant encoded control commands being transmitted when one button is pressed. In the universal transmitter a different code is stored for each button. The garage doors 1, 2, 3 and 4 each possess a receiver with which the control commands transmitted by a transmitter can be received. However, the control commands are only evaluated if the code stored in the receiver agrees with the encoding of the control commands. Here, the broken lines indicate which door can be opened with which buttons. The same applies to the user-configurable transmitter 6 with this only possessing two buttons T1' and T2'. The transmitters 5 and 6 are in addition fitted with connecting sockets 8 and 9 respectively so that a data link between the transmitters can be generated temporarily by plugging in a link cable 7 to the two connecting sockets.

In the use of the remote control, it is necessary to distinguish between the initializing operation and normal operation. When the remote control is delivered, initially only the universal transmitter is encoded so that the user-configurable transmitters and the individual receivers have to be initialized. The initializing of the receivers is done by setting the receivers to initializing operation by means of a change-over facility on the receiver side. By pressing a certain button of the universal transmitter, the code then transmitted by the transmitter is stored in a memory store of the relevant receiver. In this way, the receiver is allocated to the previously pressed button of the transmitter and can only be opened by the transmission of a code corresponding to this button. In this status, the system can already be operated by the universal transmitter. To allow the system to be extended to several users, it is necessary in a further step to transfer the codes stored in the universal transmitter 5 to several user-configurable transmitters 6.

As indicated by the arrows A and B in FIG. 1, a transfer of the code can, for example, be performed from button T2 to button T1' and from button T4 to button T2'. For this purpose, the universal transmitter 5 is first connected to the user-configurable transmitter 6 by means of a connecting cable 7. The connecting sockets 8, 9 are designed in such a way here that when the connecting cable is plugged in, the transmitters automatically switch to initializing operation. The transfer of the code indicated by arrow A is then performed simply by simultaneously pressing buttons T2 and T1'. The same applies for the transfer indicated by arrow B from button T4 to button T2'. By means of an internal encoding in the transmitters it is furthermore ensured that a transfer of a code can only be performed from one universal transmitter. In this way, an increase in the security of the whole system can be achieved, as only the person in possession of a universal transmitter can perform the reproduction of the code to further user-configurable transmitters. Once the initialization operation has been concluded in this way, it is possible to switch automatically back to normal operation by removing the connecting cable 7 from the connecting sockets 8, 9.

As indicated by the broken lines, in normal operation door 2 can thus, for example, be opened by button T2 of the universal transmitter 5 or by button T1' of the user-configurable transmitter 6. The same is true for door 4, which can be opened by button T4 or button T2'. In contrast, doors 1 and 3 can only be opened by buttons T1 and T3 of the universal transmitter 5 without any operation being possible by the user-configurable transmitters 6.

Figure 2:
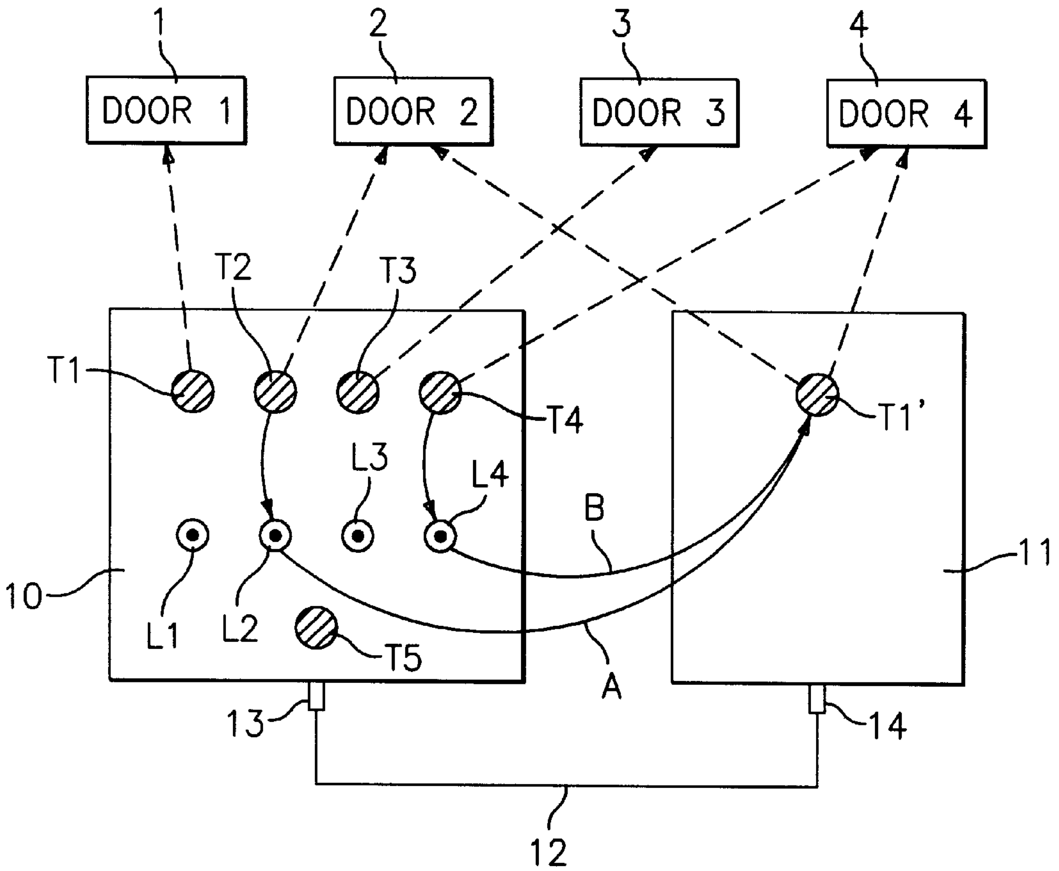
FIG. 2 a schematic representation of a second embodiment of the code transfer between two transmitters in accordance with the invention.
Figure 3:
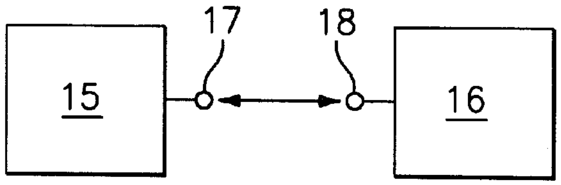
FIG. 3 is a schematic representation of a third embodiment illustrating code transfer between two transmitters by wireless connection.

FIG. 2 shows a schematic representation of a second embodiment of the code transfer between two transmitters in accordance with the invention. The arrangement shown in FIG. 2 differs over that of the embodiment in FIG. 1 essentially in that now no selective transmission of the stored and encoded control commands is possible with the user-configurable transmitter 11. The user-configurable transmitter 11 rather possesses only one button T1'. When this button is pressed, all codes or commands stored in the transmitter 11 are transmitted in series. For the initialization operation this has the consequence that no separate transfer for different buttons of the user-configurable transmitter 11 can be performed from the universal transmitter 10, either. For this reason, the universal transmitter 10 is equipped with further devices which allow a previous selection of the codes to be transferred. For this purpose, 4 single LEDs L1, L2, L3 and L4 are positioned below the four buttons T1, T2, T3 and T4. As soon as the universal transmitter 10 is set into initialization operation by plugging the connection cable 12 into the connecting sockets 13 and 14, a selection of the codes to be transferred can first be made by pressing the buttons T1, T2, T3 or T4. As soon as a button is pressed, the corresponding LED lights up as a control. A correction can be made by pressing the corresponding button again so that the LED goes out again. After the codes to be transferred have been selected, these can be transferred to the user-configurable transmitter 11 at once by pressing button T5. In the example in accordance with FIG. 2, as indicated by arrows A and B only the codes of buttons T2 and T4 should be transferred to the user-configurable transmitter 11. As soon as this has been done, the transmitters can be put back into normal operation by unplugging the connecting cable 12 from the connecting sockets 13 and 14. Then, with the user-configurable transmitter 11, the doors 2 and 4 can be opened by pressing button T1', but not doors 1 and 3.

I claim:

1. A remote control for wireless transmission of control commands from a transmitter to a plurality of receivers, in particular for the remote control of several garage doors with an encoding device provided in a first transmitter which effects encoding of control commands to be transmitted, the transmitter for the remote control being a second transmitter, wherein in said first transmitter, a different code is stored for each said receiver, a data link is arranged to be generated temporarily between the first transmitter and the second transmitter in such a way that at least one code is transferred from the encoding device of the first transmitter to an encoding device of the second transmitter, at least one universal transmitter is provided as the first transmitter and several user-configurable transmitters are provided as the second transmitter, with a code being arranged to be transferred to at least one of the user-configurable transmitters only by the universal transmitter.

2. A remote control in accordance with claim 1, wherein the corresponding codes are stored in an unalterable manner in the universal transmitter during its manufacture.

3. A remote control in accordance with claim 1, wherein in the universal transmitter, corresponding codes are arranged to be set individually.

4. A remote control in accordance with claim 3, comprising an integrated random generator arranged to be actuated by a hidden button for individually setting the corresponding codes in the universal transmitter.

5. A remote control in accordance with claim 1, wherein by means of the universal transmitter, a receiver can be initialized by a code stored in the universal transmitter being transferred to and stored in the relevant receiver.

6. A remote control in accordance with claim 1, wherein a certain button on the universal transmitter is allocated to each of the codes stored in the encoding device in the universal transmitter and arranged such that when the button is pressed, transmission of the control commands encoded by the corresponding code is performed to the requisite user-configurable transmitter.

7. A remote control in accordance with claim 1, wherein exactly one button is provided on the user-configurable transmitter such that when this button is pressed repeatedly, transmission of several sequences of control commands is performed with number of sequences corresponding to number of codes stored in the encoding device of the user-configurable transmitter and with each sequence being encoded with a different code in each case.

8. The combination in accordance with claim 1, wherein a display unit is provided on the first transmitter which display unit displays the current status of the first transmitter.

9. The combination in accordance with claim 1, wherein the data link between the first transmitter and the second transmitter is performed by an electrical line connection.

10. The combination in accordance with claim 1, wherein the data link between the first transmitter and the second transmitter is performed by an opto-electronic connection or a radio connection.

11. The combination of claim 1, wherein only one code is allocated to each receiver, encoding of the second transmitter is arranged to be spatially independent of the receivers, and the second transmitter is encoded by at least affirmative operation of the first transmitter to ensure security of the entire system.

12. The combination of claim 1, comprising a plurality of buttons situated upon the first transmitter, each said button being arranged to transfer a respective code upon being depressed to the second transmitter, respective codes being stored in said receivers on said garage door corresponding to said plurality of buttons on said first transmitter, said second transmitter also comprising a plurality of buttons;

means initializing each of said receivers by depressing a certain button on said first transmitter to transmit said respective code to said receiver, whereby said respective garage door can only be opened by transmission of said respective code, and means for transferring said respective code to said second transmitter by simultaneously pressing said respective buttons on said first and second transmitters to transfer respective codes from first said transmitter to said second transmitter, whereby operation of said respective garage doors by depressing said respective buttons on said second transmitter can be carried out in a secure manner.

13. The combination of claim 1, comprising a plurality of buttons situated on said first transmitter and arranged to selectively transfer a code to a respective one of said receivers upon being depressed, respective codes stored in said receivers on said garage doors corresponding to said plurality of buttons on said first transmitter, a further single control button situated upon said first transmitter and said second transmitter comprising just a single button, means for initializing each said receiver by depressing a certain selective button on said first transmitter to transmit said respective code to said receiver, whereby said respective garage door can only be opened by transmission of said respective code, and means for transferring said respective code to said second transmitter by simultaneously pressing said respective selective button and said control button upon said first transmitter and said single button on said second transmitter to transfer said respective code to said second transmitter, whereby operation of said respective garage door by depressing said respective single button on said second transmitter an appropriate sequence, can be carried out.

* * * * *